(12) United States Patent
Chiba et al.

(10) Patent No.: US 8,471,896 B2
(45) Date of Patent: Jun. 25, 2013

(54) SIGNAL PROCESSING APPARATUS, SIGNAL PROCESSING METHOD, DISPLAY APPARATUS, AND PROGRAM PRODUCT

(75) Inventors: Nobutane Chiba, Kanagawa (JP); Yasuyuki Uemura, Kanagawa (JP)

(73) Assignee: Sony Corporation (JP)

( * ) Notice: Subject to any disclaimer, the term of this patent is extended or adjusted under 35 U.S.C. 154(b) by 276 days.

(21) Appl. No.: 13/065,718

(22) Filed: Mar. 29, 2011

(65) Prior Publication Data

US 2011/0249098 A1    Oct. 13, 2011

(30) Foreign Application Priority Data

Apr. 7, 2010   (JP) ................ P2010-088957

(51) Int. Cl.
*H04N 13/00*   (2006.01)
*G06K 9/00*   (2006.01)

(52) U.S. Cl.
USPC .......................................... 348/47; 382/154

(58) Field of Classification Search
USPC .......................................... 348/47; 382/154
See application file for complete search history.

(56) References Cited

U.S. PATENT DOCUMENTS

| 6,125,198 A * | 9/2000 | Onda ............................. 382/154 |
| 2004/0233275 A1 | 11/2004 | Tomita |
| 2008/0240549 A1 | 10/2008 | Koo et al. |

FOREIGN PATENT DOCUMENTS

| EP | 1489857 A1 | 12/2004 |
| JP | 10-271535 A | 10/1998 |
| JP | 2002-125245 A | 4/2002 |
| JP | 2007-318184 A | 12/2007 |
| WO | 2005060271 A1 | 6/2005 |
| WO | 2010046824 A1 | 4/2010 |

OTHER PUBLICATIONS

European Search Report EP 11159154, dated Jan. 23, 2012.

* cited by examiner

*Primary Examiner* — David Czekaj
*Assistant Examiner* — Tsion B Owens
(74) *Attorney, Agent, or Firm* — Lerner, David, Littenberg, Krumholz & Mentlik, LLP

(57) ABSTRACT

A signal processing apparatus includes: a phase matching unit which matches phases of a left image signal and a right image signal input from two cameras which are disposed so as to be matched with an interval between both eyes of a human to image the same object; and a phase adjusting unit which moves in a horizontal direction by a predetermined distance both or any one of a left image and a right image displayed on a display unit by the left image signal and the right image signal by changing the phases of the left image signal and/or the right image signal in the horizontal direction based on displacement amounts of phases designated by an operating unit, and outputs the left image signal and the right image signal obtained by changing disparity between the left image and the right image.

6 Claims, 13 Drawing Sheets

FIG. 4A I_LEFT_DATA (LEFT IMAGE SIGNAL) 

FIG. 4B LEFT_HD (LEFT IMAGE HORIZONTAL TIMING) 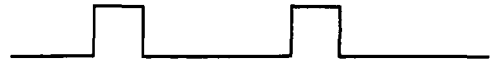

FIG. 4C I_LEFT_TIMING (LEFT IMAGE HORIZONTAL EDGE TIMING) 

FIG. 4D WR_ADRS_LEFT (LEFT IMAGE WRITING ADDRESS) 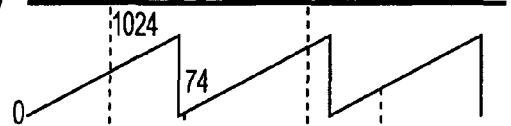

FIG. 4E RE_START_LEFT (LEFT IMAGE READING START ADDRESS) 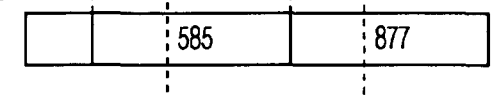

FIG. 4F ADD_ADRS_LEFT (LEFT IMAGE ADDTION ADDRESS) 

FIG. 4G I_RIGHT_DATA (RIGHT IMAGE SIGNAL) 

FIG. 4H RIGHT_HD (RIGHT IMAGE HORIZONTAL TIMING) 

FIG. 4I I_RIGHT_TIMING (RIGHT IMAGE HORIZONTAL EDGE TIMING) 

FIG. 4J WR_ADRS_RIGHT (RIGHT IMAGE WRITING ADDRESS) 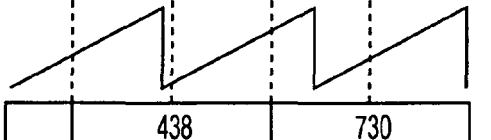

FIG. 4K RE_START_RIGHT (RIGHT IMAGE READING START ADDRESS) 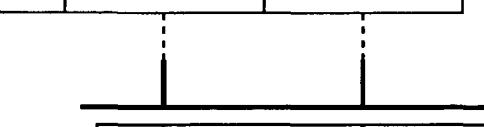

FIG. 4L EQ_TIM1 (EQUIVALENT TIMING) 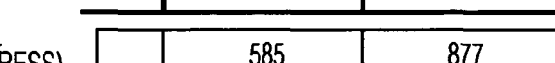

FIG. 4M LEFT_ADRS_CONTROL (LEFT IMAGE CONTROL ADDRESS) 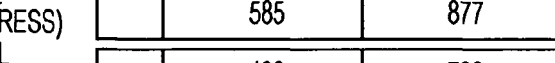

FIG. 4N RIGHT_ADRS_CONTROL (RIGHT IMAGE CONTROL ADDRESS) 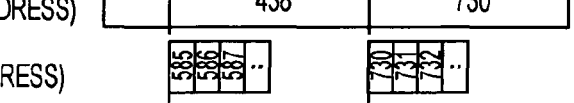

FIG. 4O RE_ADRS_LEFT (LEFT IMAGE READING ADDRESS) 

FIG. 4P O_LEFT_DATA (LEFT IMAGE SIGNAL) 

FIG. 4Q RE_ADRS_RIGHT (RIGHT IMAGE READING ADDRESS) 

FIG. 4R O_RIGHT_DATA (RIGHT IMAGE SIGNAL) 

FIG. 4S LEFT_ADRS_CONTROL (LEFT IMAGE CONTROL ADDRESS) 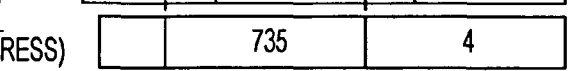

FIG. 4T RE_ADRS_LEFT (LEFT IMAGE READING ADDRESS) 

FIG. 4U O_LEFT_DATA (LEFT IMAGE SIGNAL) 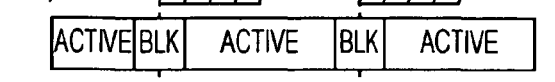

SIGNAL PROCESSING APPARATUS, SIGNAL PROCESSING METHOD, DISPLAY APPARATUS, AND PROGRAM PRODUCT

CROSS-REFERENCE TO RELATED APPLICATION

The present application claims priority from Japanese Patent Application No. JP 2010-088957 filed in the Japanese Patent Office on Apr. 7, 2010, the entire content of which is incorporated herein by reference.

BACKGROUND OF THE INVENTION

1. Field of the Invention

The present invention relates to a signal processing apparatus, a signal processing method, a display apparatus, and a program product which can be preferably applied when changing disparity of images output by imaging a same object with two cameras disposed with disparity.

2. Description of the Related Art

In the related art, there is a technique for creating a three-dimensional image, which can be stereoscopically viewed by a user, with the use of images of a same object captured with two cameras installed so as to match the disparity of the left and right eyes of the user. The images captured by the two cameras are called a left image and a right image (hereinafter the left image and the right image are also referred to as "left and right images" collectively) in accordance with the left and right eyes of the user. It is difficult to precisely display the images as a three-dimensional image if setting parameters for the left and right images of the two cameras such as coloring, illuminance, an imaging position, and the like are not matched. Accordingly, the user who operated the cameras displayed the left and right images respectively on two horizontally or vertically disposed monitors or the like, and matched the setting parameters while comparing the left and right images.

In addition, in order to generate a three-dimensional image and change the way of adding depth thereto, it was necessary to move and correct the position of an object of which left and right images had parallax in the related art. Then, the user confirmed whether the depth was the one which was intended by causing a three-dimensional monitor to display the image obtained by imaging the corrected object.

Japanese Unexamined Patent Application Publication No. 2002-125245 discloses a stereoscopic apparatus which displays left and right images side by side, that is, a technique for horizontally moving an image and setting a stereoscopic position.

SUMMARY OF THE INVENTION

Incidentally, when a three-dimensional image is captured, mechanical disparity of the cameras is adjusted by adjusting a rig on which two cameras are installed to capture the left and right images after simulating the disparity on a three-dimensional monitor. Here, it is assumed that the three-dimensional monitor is caused to have a function of displaying left and right images which have been moved by equal distances in horizontally opposite directions. At this time, a user starts to correct actual data after stereoscopically viewing an object on the three-dimensional monitor to confirm the correction effect since the user pays attentiononly to the object as a target of change. For this reason, it is necessary to adjust the rig to adjust the position of the cameras every time the object moves, which is why it takes a long time to capture the three-dimensional image.

It is desirable to provide a technique to easily adjust disparity in left and right images.

In an embodiment of the present invention, phases of a left image signal and a right image signal input from two cameras which are disposed so as to be matched with an interval between both eyes of a human to image the same object are matched.

Next, the phases of the left image signal and/or the right image signal in the horizontal direction are changed based on displacement amounts of phases designated by an operating unit.

Then, both or any one of the left image and the right image displayed on a display unit by the left image signal and the right image signal are moved in a horizontal direction by a predetermined distance, and the left image signal and the right image signal obtained by changing disparity between the left image and the right image are output.

With such a configuration, it is possible to move both or any one of the left image and the right image displayed on the display unit by a predetermined distance.

According to an embodiment of the present invention, both or any one of the left image and the right image displayed on a display unit by the left image signal and the right image signal are moved in a horizontal direction by a predetermined distance, and the left image signal and the right image signal obtained by changing disparity between the left image and the right image are output. Accordingly, the user can easily confirm the change in the stereoscopic view of an image obtained by changing the disparity, by operating the operating unit while viewing the display unit displaying the left image and the right image for which the disparity has been changed.

BRIEF DESCRIPTION OF THE DRAWINGS

FIGS. 4A to 4U is a timing chart illustrating an example of processing timing of the respective parts in a signal processing apparatus according to an embodiment of the present invention;

DESCRIPTION OF THE PREFERRED EMBODIMENTS

Hereinafter, description will be made of best modes for the invention (hereinafter, referred to as embodiments). In addition, the description will be made in the following order:

1. First Embodiment (Output Control for Signals of Left and Right Images: Example in Which Phases of Left and Right Images Are Adjusted)<

<1. First Embodiment>
[Example in which Phases of Left and Right Images are Adjusted]

Hereinafter, description will be made of an embodiment of the present invention with reference to the accompanying drawings. According to this embodiment, description will be made of an example in which the present invention is applied to a signal processing apparatus 10 which changes the phases of the left and right images to output the images and an example in which the present invention is applied to a signal processing method to be used by the signal processing apparatus 10. In addition, although the following description will be made of an example in which the present invention is applied to a case in which the signal processing apparatus 10 is separately provided from a display unit 8 as a three-dimensional monitor capable of displaying a three-dimensional image, the present invention is also applicable to a display apparatus in which the signal processing apparatus 10 and the display unit 8 are assembled.

Figure 1A:
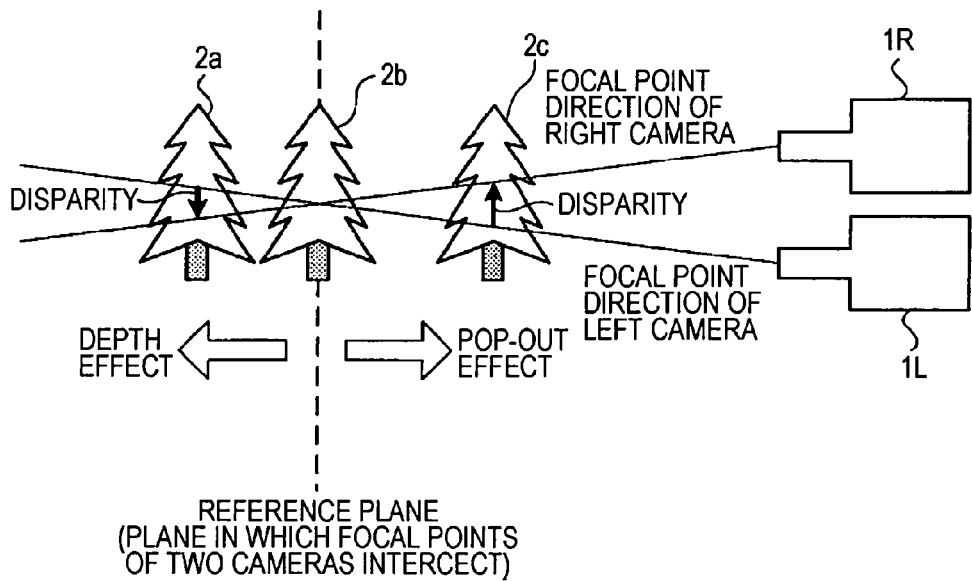
FIGS. 1A and 1B are configuration diagrams illustrating an example in which two cameras are arranged so as to be matched with an interval between both eyes of a human according to an embodiment of the present invention.
Figure 1B:
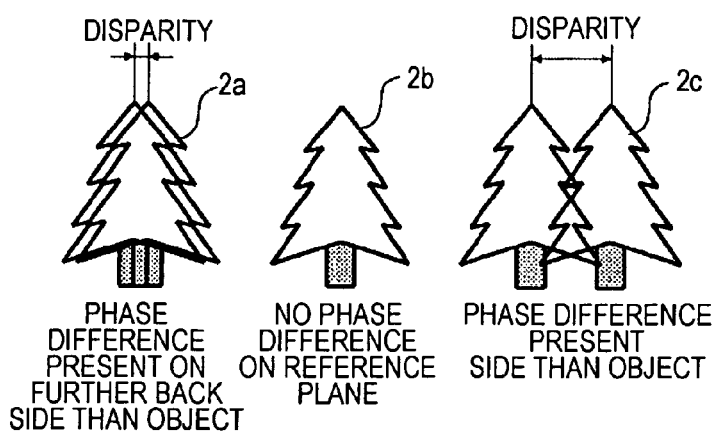

FIGS. 1A and 1B show an example in which two cameras 1L and 1R are arranged so as to be matched to an interval between both eyes of a human.

FIG. 1A shows an arrangement example of the two cameras 1L and 1R.

FIG. 1B shows an example of a difference in appearances of objects 2a to 2c.

The camera 1L (left camera) which outputs a left image signal and the camera 1R (right camera) which outputs a right image signal are arranged side by side so as to be matched with an interval of both eyes of a human to image the same object. The display unit 8 (see FIG. 2, which will be described later) displays the left image when the left image signal is input and displays the right image when the right image signal is input. Assuming the intersection point between the cameras 1L and 1R in the focal point direction as a reference plane, the disparity can be obtained based on the distance between the intersection point of the reference plane and the cameras 1L and 1R.

Here, the image of the object 2b displayed on the display unit 8 is not stereoscopically viewed by a user since the object 2b is positioned in the reference plane. However, the object 2a displayed on the display unit 8 is viewed by the user as if the object 2a is positioned further back than the reference plane due to the depth effect since the object 2a is positioned further back than the cameras 1L and 1R with respect to the reference plane. On the other hand, the object 2c displayed on the display unit 8 is viewed by the user as if the object 2c is positioned further forward than the reference plane due to the pop-out effect since the object 2c is positioned further forward than the cameras 1L and 1R with respect to the reference plane.

Assuming the plane which is obtained based on the intersection point of the focal points of the two cameras as a reference plane, the "pop-out effect" can be obtained if the object is positioned further forward than the reference plane, and the "depth effect" can be obtained if the object is positioned further back than the reference plane. At this time, the difference between the focal points of the two cameras is called "disparity" and is a value playing an important role in capturing a three-dimensional image. The point to which the image creator pays closest attention is the point regarding from which position the object does not appear as a three-dimensional image. Accordingly, the longest time is taken by the setting of the cameras 1L and 1R including the positional relation thereof.

Figure 2:
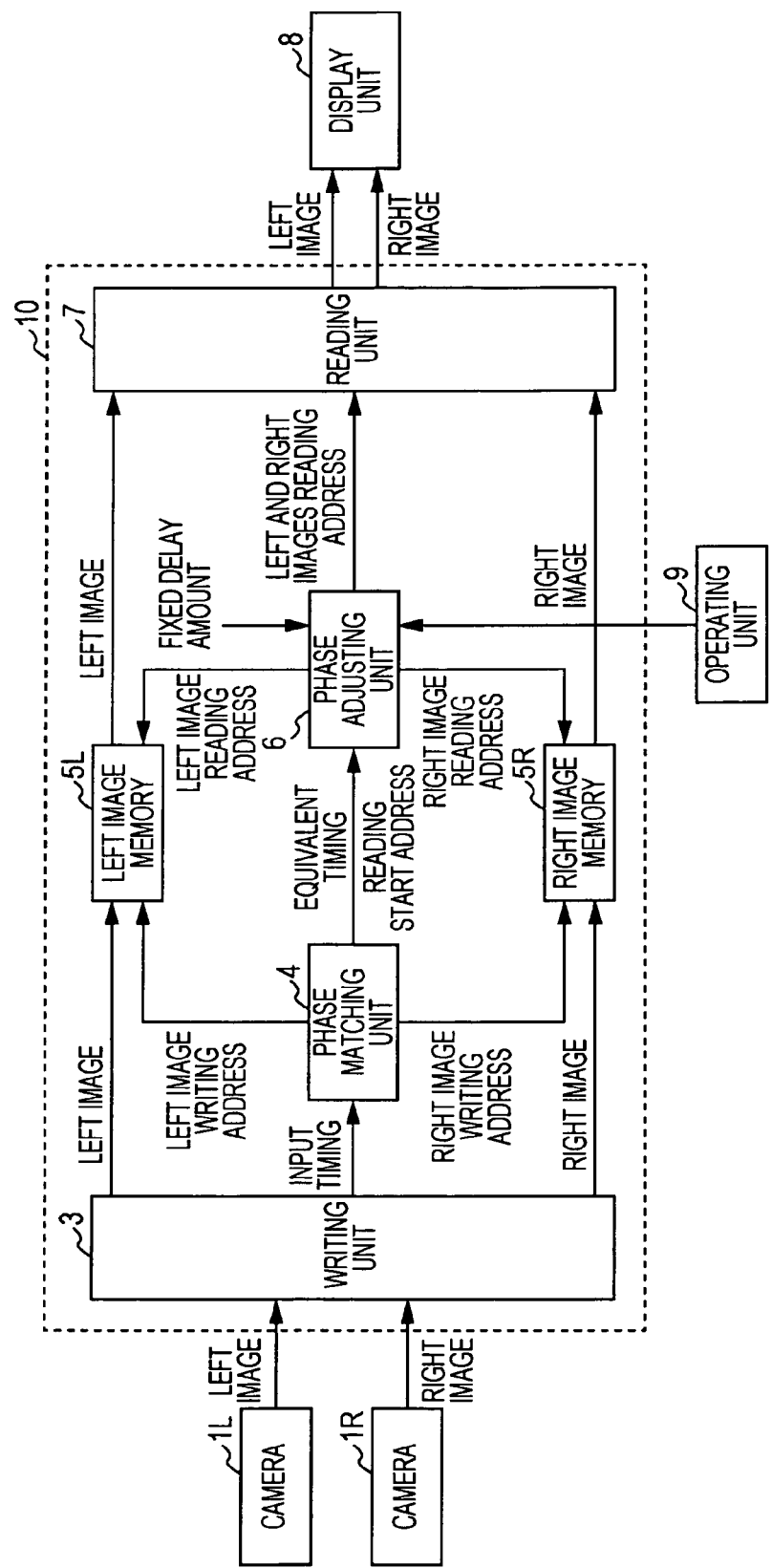
FIG. 2 is a block diagram illustrating an internal configuration example of a signal processing apparatus according to an embodiment of the present invention.

FIG. 2 shows an internal configuration example of the signal processing apparatus 10.

The signal processing apparatus 10 is provided with a writing unit 3 which writes the left image (left image signal) input from the camera 1L in the left image memory 5L and the right image (right image signal) input from the camera 1R in the right image memory 5R. In addition, a phase matching unit 4 is provided to match the phases of the left image signal and the right image signal input from the two cameras (cameras 1L and 1R), which are arranged so as to be matched with the interval between both eyes of a human to capture the same object, based on the writing timing of the left and right images input from the writing unit 3.

In addition, a phase adjusting unit 6 is provided to change the phases of the left image signal and/or the right image signal in the horizontal direction based on the displacement amount designated by an operating unit 9. The phase adjusting unit 6 moves both or any one of the left image and the right image displayed on the display unit 8 by the left image signal and the right image signal in the horizontal direction by a predetermined distance, and outputs the left image signal and the right image signal for which the disparity between the left image and the right image has been changed. In addition, a reading unit 7 is provided to read the left image from the left image memory 5L and right image from the right image memory 5R and outputs the read left and right images to the display unit 8.

A dual-port RAM (Random Access Memory) is used for the respective left image memory 5L and the right image memory 5R in this embodiment. In addition, a rotary switch is used, for example, for the operating unit 9, and it is possible to select an image to be moved from among the left and right images or set the movement amount by the input operation of a user. At this time, it is also possible to move only the left image or the right image or to simultaneously move both the left and right images.

Next, description will be made of the operations of the respective parts.

The cameras 1L and 1R input the left and right images to the signal processing apparatus 10. The writing unit 3 writes the input left and right images to the left image memory 5L and the right image memory 5R, respectively. In addition, the writing unit 3 outputs to the phase matching unit 4 the input timing of the left and right images input to the signal processing apparatus 10.

The phase matching unit 4 outputs to the left image memory 5L the left image writing address which has been obtained at the input timing received from the writing unit 3 and is used when the writing unit 3 writes the left image in the left image memory 5L. In the same manner, the phase matching unit 4 outputs to the right image memory 5R the right image writing address used when the writing unit 3 writes the right image in the right image memory 5R. In addition, the phase matching unit 4 outputs to the phase adjusting unit 6 the reading start address to be used to cause the reading unit 7 to read the left image from the left image memory 5L and the right image from the right image memory and the equivalent timing, which will be described later.

The phase adjusting unit 6 adds a delay amount operated and input by the operating unit 9 to the reading start address received from the phase matching unit 4. Then, the phase adjusting unit 6 obtains the left image reading address used when the reading unit 7 reads the left image from the left image memory 5L and the right image reading address used when the reading unit 7 reads the right image from the right image memory 5R and outputs the left image reading address and the right image reading address to the reading unit 7.

The reading unit 7 reads the left image from the left image memory 5L and the right image from the right image memory 5R based on the left image reading address and the right image reading address received from the phase adjusting unit 6, and outputs the left image and the right image to the display unit 8. In addition, the display unit 8 is a three-dimensional monitor which displays the object in the three-dimensional manner based on the left image signal read from the left image memory 5L and the right image signal read from the right image memory 5R.

Figure 3:
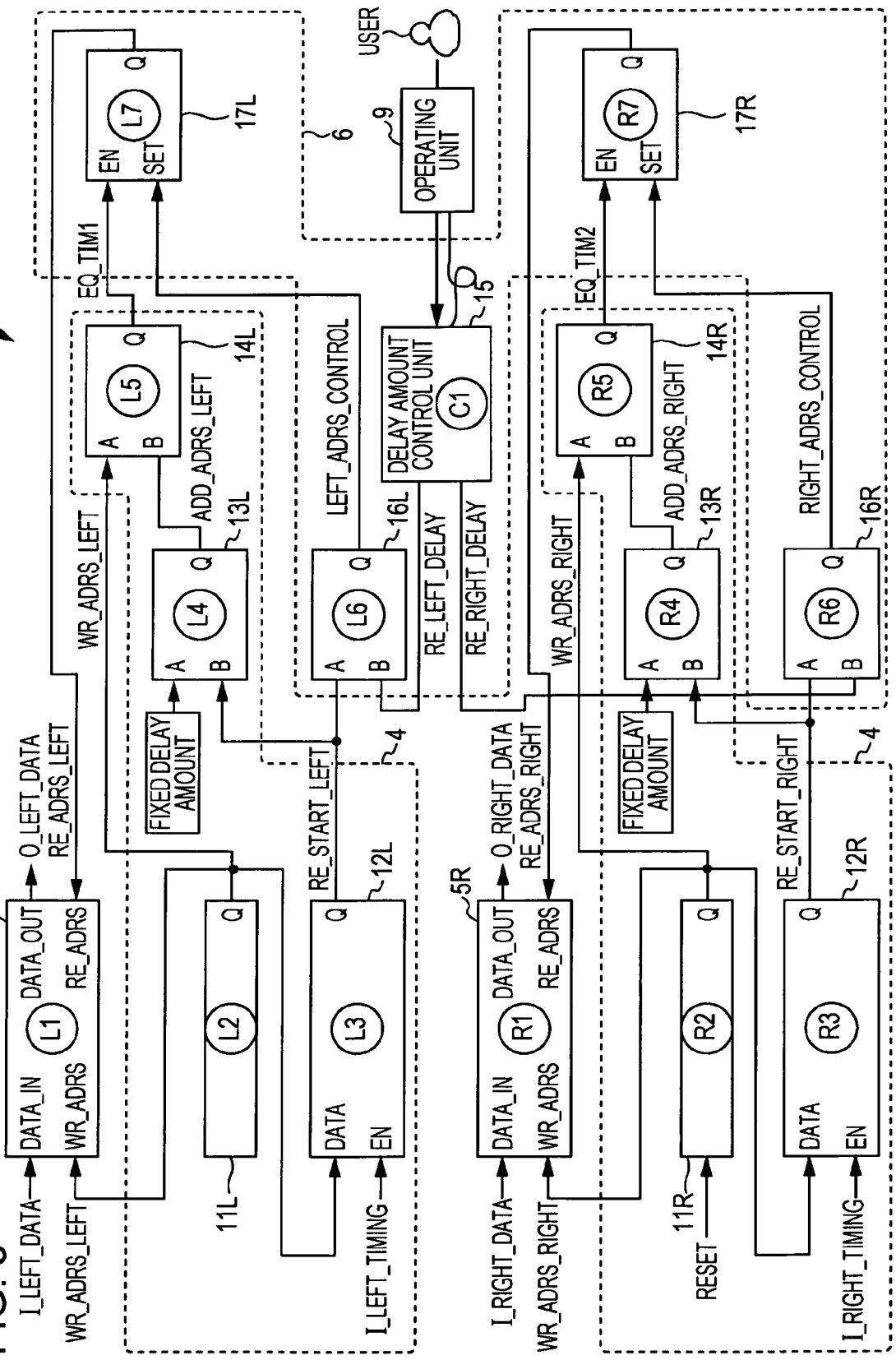
FIG. 3 is a block diagram illustrating an internal configuration example of a signal processing apparatus according to an embodiment of the present invention.

FIG. 3 shows a more detailed internal configuration example of the signal processing apparatus 10.

The signal processing apparatus 10 individually performs processing on the left image signal and the right image signal in order to adjust the phases of the left image signal and the right image signal.

As shown in FIG. 2, the signal processing apparatus 10 is provided with the left image memory 5L which stores the left image. The left image data (I_LEFT_DATA) defined by the left image signal and the left image writing address (WR_ADRS_LEFT) which designate the writing address to the left image memory 5L are input to the left image memory 5L. In addition, the reading address (RE_ADRS_LEFT) for the left image which is read by the read unit 7 is input to the left image memory 5L, and the left image data (O_LEFT_DATA) with the adjusted phase is read by the reading unit 7.

The phase matching unit 4 is provided with a left image writing address counter 11L which counts the writing address for the left image signal which is written by the writing unit 3 in the left image memory 5L. In addition, the phase matching unit 4 is provided with a right image writing address counter 11R which counts the writing address for the right image signal which is written by the writing unit 3 in the right image memory 5R. The left image writing address counter 11L repeats the processing of counting the address for the left image data to be written in the left image memory 5L, resetting the address to zero when the counted address exceeds a predetermined value (10 bits (1023), for example), and counting the address again. This processing is performed in the same manner in the right image writing address counter 11R.

Moreover, the phase matching unit 4 is provided with a left image address sampling unit 12L, which obtains the left image reading start address to be used when the reading unit 3 reads the left image signal from the left image memory 5L, based on the writing address. Furthermore, the phase matching unit 4 is provided with a right image address sampling unit 12R, which obtains the right image reading start address to be used when the reading unit 3 reads the right image signal from the right image memory 5R.

In addition, the phase matching unit 4 is provided with a first adding unit 13L which outputs a left image added address obtained by adding a fixed delay amount determined based on the phase variable amount of the left image signal and the left image reading start address. Moreover, the phase matching unit 4 is provided with a first adding unit 13R which outputs a right image added address obtained by adding a fixed delay amount determined based on the phase variable amount of the right image signal and the right image reading start address. The left image reading start address (RE_START_LEFT) from the left image address sampling unit 12L is input to the first adding unit 13L in addition to the fixed delay amount. The first adding unit 13L outputs the added left image added address (ADD_ADRS_LEFT). The same processing is performed in the first adding unit 13R.

In addition, the phase matching unit 4 is provided with a comparing unit 14L which compares the left image writing address with the left image added address and outputs the position of the left image added address in the left image writing address as an equivalent timing at which the phases of the left image signal and the right image signal are matched. Moreover, the phase matching unit 4 is provided with a comparing unit 14R which compares the right image writing address with the right image added address and outputs the position of the right image added address in the right image writing address as an equivalent timing at which the phases of the left image signal and the right image signal are matched. The comparing unit 14L compares the left image writing address (WR_ADRS_LEFT) input from the left image writing address counter 11L with the left image added address (ADD_ADRS_LEFT) input from the first adding unit 13L. Then, the comparing unit 14L outputs the result of the comparison. It is possible to match the phases of the left and right images by inputting the result of the comparison to the left image reading address counter 17L. The same processing is performed in the comparing unit 14R.

A timing signal (I_LEFT_TIMING) is input to the left image address sampling unit 12L from a timing generator, which is not shown in the drawing, in order to sample the left image writing address. In addition, the left image writing address is input to the left image address sampling unit 12L from the left image writing address counter 11L. Then, the left image address sampling unit 12L outputs to the phase adjusting unit 6 the left image reading start address (RE_START_LEFT), which designates the start position of the left image signal, based on the sampled left image writing address.

The phase adjusting unit 6 is provided with a delay amount control unit 15 which controls the reading delay amount of the left image signal read from the left image memory 5L and the reading delay amount of the right image signal read from the right image memory 5R, based on the input operation of the operating unit 9. A CPU (Central Processing Unit) is used for the delay amount control unit 15, for example. The operating unit 9 includes, for example, a volume controller, and the delay amount control unit 15 determines the delay amount of the left image or the right image in response to the instruction from the volume controller operated by the user.

In addition, the phase adjusting unit 6 is provided with a second adding unit 16L which adds the left image reading delay amount and the left image reading start address and outputs the left image control address to be used for controlling the reading position of the left image signal read from the left image signal 5L from the left image memory 5L. Moreover, the phase adjusting unit 6 is provided with a second adding unit 16R which adds the right image reading delay amount and the right image reading start address and outputs the right image control address to be used for controlling the reading position of the right image signal read from the right image signal 5R from the right image memory 5R.

The left image reading delay amount (RE_LEFT_DELAY) from the delay amount control unit 15 and the left image reading start address (RE_START_LEFT) from the left image address sampling unit 12L are input to the second adding unit 16L. Then, the second adding unit 16L adds the left image reading delay amount (RE_LEFT_DELAY) to be used as a phase change amount designated by a user operation to the left image reading start address (RE_START_LEFT) to be used as a reference address. Then, this added left image control address (LEFT_ADRS_CONTROL) is output. Here, since the phase of the left image does not change when the phase change amount is equal to the fixed delay amount, the left image displayed on the display unit 8 does not move. The same processing is performed in the second adding unit 16R.

In addition, the phase adjusting unit 7 is provided with a left image reading address counter 17L which counts the left image reading address for the left image signal read from the left image memory 5L by the reading unit 7 based on the equivalent timing and the left image control address. Moreover, the phase adjusting unit 7 is provided with a right image reading address counter 17R which counts the right image reading address for the right image signal read from the right image memory 5R by the reading unit 7 based on the equivalent timing and the right image control address.

The left image control address (LEFT_ADRS_COTROL) from the second adding unit 16L and the result of comparison from the comparing unit 14L is input to the left image reading address counter 17L. Then, the left image reading address counter 17L outputs to the left image memory 5L and the reading unit 7 the left image reading address corresponding to the amount of delay in reading base on the result of comparison. With such operations, the reading unit 7 reads the left image data (O_LEFT_DATA) from the left image memory 5L with a predetermined delay amount. The same processing is performed in the right image reading address counter 17R.

FIGS. 4A to 4U show an example of operation timing of the respective processing parts.

FIGS. 4A to 4F show an example of timing for the processing of writing or reading the left image signal from the left image memory 5L.

FIG. 4A shows a configuration example of the left image signal.

The left image signal (I_LEFT_DATA) includes an active period (ACTIVE) representing a period for which the left image is displayed on the screen of the display unit 8 and a blanking period (BLK) representing a period for which the left image is not displayed on the screen. This left image signal is written as the left image data in the left image memory 5L.

FIG. 4B shows the timing of the horizontal blanking period of the left image signal.

This timing is determined in accordance with the start of the horizontal blanking period (HD) shown in FIG. 4A. The signal rises to "H" when the horizontal blanking period starts, and the signal falls to "L" when the horizontal blanking period ends.

FIG. 4C shows an example of a rising edge timing signal of the left image signal.

The rising edge timing signal (I_LEFT_TIMING) of the left image signal rises to "H" at the moment at which the horizontal blanking period of the left image signal starts. However, the value of this "H" rises only at the time of the start of the horizontal blanking period and immediately falls to "L".

FIG. 4D shows the writing address for the left image signal.

When the left image signal is written in the left image memory 5L, the writing address is counted for every one horizontal pixel. Then, the processing of counting the writing address (WR_ADRS_LEFT) of the left image signal from "0" up to "1023", resetting the address to "0", and then counting the address again is repeatedly performed.

FIG. 4E shows the reading start address of the left image signal.

The left image writing address counter 11L counts the left image writing address (WR_ADRS_LEFT) while the writing unit 3 writes the left image (left image signal) in the left image memory 5L. Here, the left image address sampling unit 12L receives, as the left image reading start address ("585" in this embodiment), the writing address shown in FIG. 4D at the timing when the rising edge timing signal shown in FIG. 4C becomes "H".

FIG. 4F shows an example in which the fixed delay amount is added to the reading address for the left image signal.

The first adding unit 13L adds the fixed delay amount ("512" in this embodiment) to the left image reading start address shown in FIG. 4E. As a result, the value of 1097−1023=74 can be obtained as the left image reading start address to which the fixed delay amount has been added since the address can be counted up to "1023" while the left image reading start address becomes 585+512=1097.

Here, the fixed delay amount is a value which is obtained based on the memory sizes of the left image memory 5L and the right image memory 5R. Since the fixed delay amount is assumed to be "512" in this embodiment, it is possible to shift the left and right images up to 512 pixels corresponding to the half of the screen when one horizontal line of the left and right images includes 1024 pixels. Accordingly, the value obtained by adding a displacement amount which can cancel the deviation in the phases of the left and right image signals to a variable amount when the user changes the phases with the use of the operating unit 9 is obtained in advance as the fixed delay amount. For example, when the variable amount is "1000", it is necessary to set a value at least greater than "1000" as the fixed delay amount.

FIGS. 4G to 4K show an example of timing for the processing of writing or reading the right image signal from the right image memory 5R.

FIG. 4G shows a configuration example of the right image data.

The right image signal (I_RIGHT_DATA) includes an active period (ACTIVE) representing the period for which the right image is displayed on the screen of the display unit 8 and a blanking period (BLK) representing the period for which the right image is not displayed on the screen. In addition, since the lengths of the connection wiring between the respective cameras 1L and 1R and the signal processing apparatus 10 are slightly different, the timing for inputting the left image signal and the right image signal to the signal processing apparatus 10 becomes slightly different in some cases. For this reason, it is necessary for the signal processing apparatus 10 to match the phases of the input left and right images.

FIG. 4H shows the timing of the horizontal blanking period of the right image signal.

This timing is determined based on the start of the horizontal blanking period (HD) shown in FIG. 4G. The signal rises to "H" when the horizontal blanking period starts, and the signal falls to "L" when the horizontal blanking period ends.

FIG. 4I shows an example of a rising edge timing signal of the right image signal.

The rising edge timing signal (I_RIGHT_TIMING) of the right image signal rises to "H" at the moment at which the horizontal blanking period of the right image signal starts and immediately falls to "L".

FIG. 4J shows the writing address for the right image signal.

When the right image signal is written in the right image memory 5R, the writing address is counted for every one horizontal pixel. Then, the processing of counting the writing address (WR_ADRS_RIGHT) of the right image signal from "0" up to "1023", resetting the address to "0", and then counting the address again is repeatedly performed.

FIG. 4K shows the reading start address of the right image signal.

The right image writing address counter 11R counts the right image writing address (WR_ADRS_RIGHT) while the writing unit 3 writes the right image (right image signal) in the right image memory 5R. Here, the right image address sampling unit 12R receives, as the right image reading start address ("438" in this embodiment), the writing address shown in FIG. 4J at the timing when the rising edge timing signal shown in FIG. 4I becomes "H".

FIGS. 4L to 4U show an example of processing for adjusting the phases of the left and right images.

FIG. 4L shows an equivalent timing at which the left image writing address becomes equal to the added left image writing address.

This drawing shows the equivalent timing (EQ_TIM1) at which the signal rises to "H" when the left image writing address (WR_ADRS_LEFT) shown in FIG. 4D becomes equal to the left image added address (ADD_ADRS_LEFT) shown in FIG. 4F, to which the fixed delay amount "512" has been added.

FIG. 4M shows an example of the left image control address.

As the left image control address (LEFT_ADRS_CONTROL), an example will be shown in which the left image reading start address (RE_START_LEFT) shown in FIG. 4E is matched with the equivalent timing (EQ_TIM1) shown in FIG. 4L.

FIG. 4N shows an example of the right image control address.

As the right image control address (RIGHT_ADRS_CONTROL), an example will be shown in which the right image reading start address (RE_START_RIGHT) shown in FIG. 4K is matched with the equivalent timing (EQ_TIM1) shown in FIG. 4L.

The phase change amounts, which are set by the delay amount control unit 15, of both the left image control address (LEFT_ADRS_CONTROL) shown in FIG. 4M and the right image control address (RIGHT_ADRS_CONTROL) shown in FIG. 4N are "0".

FIG. 4O shows an example of an address value of the left image reading address.

As shown in FIG. 4M, the left image control address (LEFT_ADRS_CONTROL) starts the reading counter from "585". Then, the left image reading address counter 17L increases the count of the reading counter in increments of "1".

FIG. 4P shows a configuration example of the left image signal.

The drawing shows that the start position of the blanking period of the left image signal (O_LEFT_DATA) corresponds to the position represented as the equivalent timing shown in FIG. 4L.

FIG. 4Q shows an example of an address value of the right image reading address.

As shown in FIG. 4M, the right image control address (RIGHT_ADRS_CONTROL) starts the reading counter from "438". Then, the right image reading address counter 17R increases the count of the reading counter in increments of "1".

FIG. 4R shows a configuration example of the right image signal.

The drawing shows that the start position of the blanking period of the right image signal (O_RIGHT_DATA) corresponds to the position represented as the equivalent timing shown in FIG. 4L.

FIGS. 4P and 4R show that the phases of the left and right image signals are matched and no deviation is generated therebetween.

Next, description will be made of the case in which the user operates the operating unit 9 to change the phase of the left image signal. Here, an example will be shown in which the phase change amount is set to "+150".

FIG. 4S shows an example of the left image control address.

As the left image control address (LEFT_ADRS_CONTROL), an example will be shown in which the left image reading start address (RE_START_LEFT) shown in FIG. 4E is matched to the position of the equivalent timing shown in FIG. 4L. Since the phase change amount is set to "+150" in this embodiment, the left image address becomes 585+150=735.

FIG. 4T shows an example of the address value of the left image reading address.

As shown in FIG. 4S, the left image control address (LEFT_ADRS_CONTROL) starts the reading counter from "735". Then, the reading counter is increased in count by an increment of "1".

FIG. 4U shows a configuration example of the left image signal.

The drawing shows that the output timing of the left image signal (O_LEFT_DATA) is delayed with respect to the equivalent timing shown in FIG. 4L due to the change of the reading timing.

Figure 5:
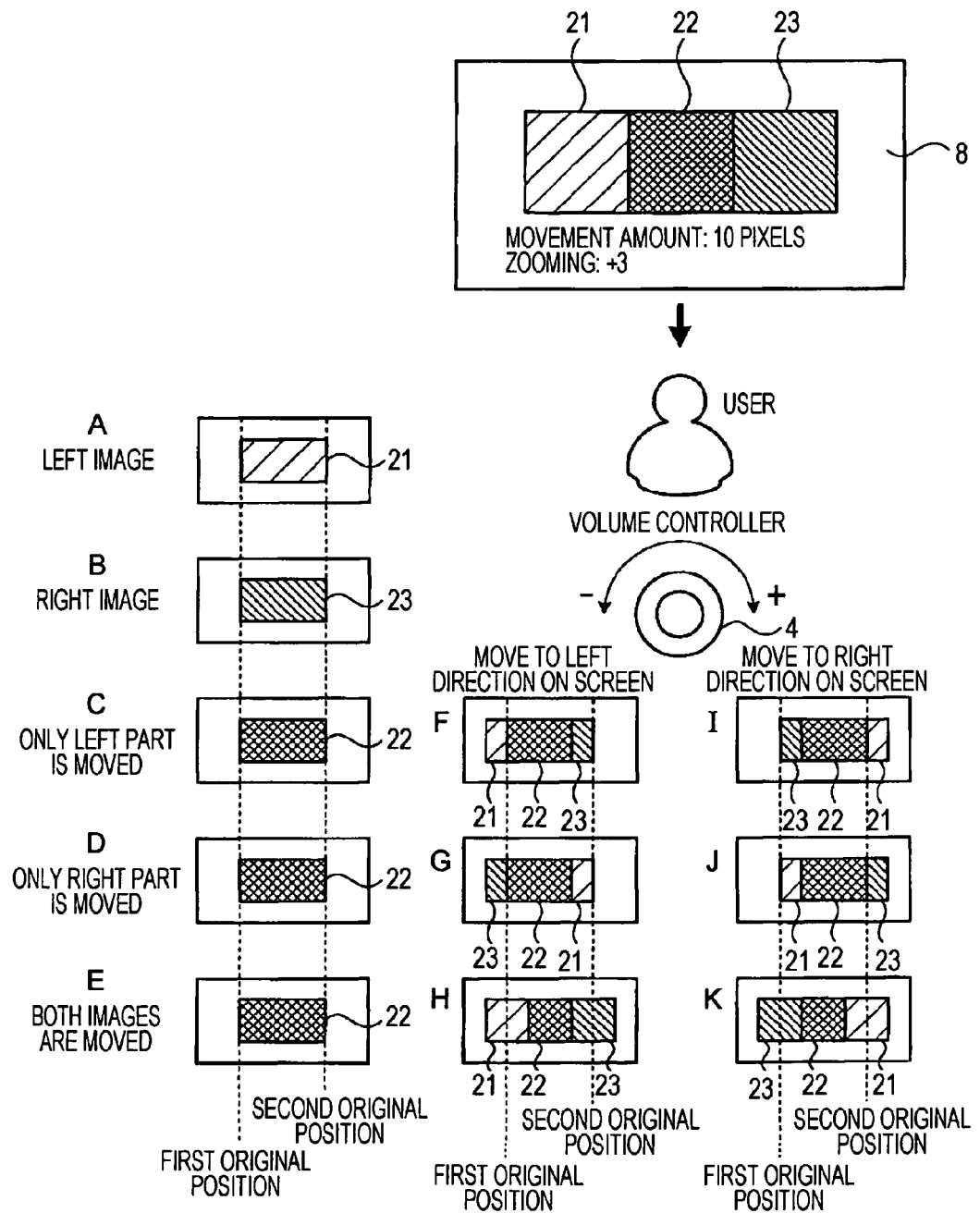
FIG. 5 is an explanatory diagram illustrating a displacement amount of the phases of the left and right images according to an embodiment of the present invention.

FIG. 5 shows an example in which the phases of the left and right images displayed on the display unit 8 are adjusted.

The display unit 8 displays a superimposed image 22 obtained by superimposing a left image 21 and a right image 23 in addition to the left image 21 and the right image 23. The user adjusts the phases of the left and right images by moving the volume controller used as the operating unit 9 in the direction of "+" or "−".

A to E of FIG. 5 show examples of the appearances at the time when the left image 21 and the right image 23 are horizontally moved.

Here, "first and second original positions" in the drawings represent the positions of both ends of the left and right images in the state in which the phases of the left and right image signals are matched. Then, the phase adjusting unit 6 controls the display unit 8 to display the displacement amount of the phases designated by the operating unit 9 or a value obtained by calculating metadata input from the cameras. Here, "zooming" is one example of the parameter of the camera, and which parameter is to be variable to obtain the reference plane at present is shown. In this embodiment, display unit 8 displays the information representing the fact that the appearance at the time when the moving amounts of the left and right images are 10 pixels is the same as the appearance at the time when the zooming of the cameras 1L and 1R is set to the present setting value "+3". In addition, it is also applicable that the user is informed that the moving amount of 10 pixels corresponds to the movement of the reference plane by X "m" to a further forward side or a further back side while the parameter is set to "distance".

A of FIG. 5 shows a display example of the left image 21.

B of FIG. 5 shows a display example of the right image 23.

C of FIG. 5 shows a display example in the case when only the left image 21 is moved from among the superimposed images 22 in the reference plane.

D of FIG. 5 shows a display example in the case when only the right image 23 is moved from among the superimposed images 22 in the reference plane.

E of FIG. 5 shows a display example in the case when both the left image 21 and the right image 23 are moved from among the superimposed images 22 in the reference plane.

In addition, C to E of FIG. 5 show the states in which the phases of the left image 21 and the right image 23 are matched with each other.

F to H of FIG. 5 show the examples of the appearances at the time when the left image 21 and the right image 23 in the positions other than the reference plane are moved to the left side.

F of FIG. 5 shows a display example when the left image 21 is moved to the left side.

At this time, the left image 21 appears on the left side of the first original position. In addition, the right image 23 of a range corresponding to the moved left image 21 appears on the left side of the second original position.

G of FIG. 5 shows a display example when the right image 23 is moved to the left side.

At this time, the right image 23 appears on the left side of the first original position. In addition, the left image 21 of a range corresponding to the moved right image 23 appears on the left side of the second original position.

H of FIG. 5 shows the display example when the left image 21 is moved to the left side and the right image 23 is moved to the right side.

The moving directions of the left image 21 and the right image 23 are opposite to each other while the movement amounts are the same. At this time, it is possible to obtain the depth effect, and the distance between the moved left image 21 and the right image 23 is set to the disparity.

I to K of FIG. 5 show the examples of the appearances at the time when the left image 21 and the right image 23 in the positions other than the reference plane are moved to the right side.

I of FIG. 5 shows a display example when the left image 21 is moved to the right side.

At this time, the left image 21 appears on the right side of the second original position. In addition, the right image 23 of a range corresponding to the moved left image 21 appears on the right side of the first original position.

J of FIG. 5 shows a display example when the right image 23 is moved to the right side.

At this time, the right image 23 appears on the right side of the second original position. In addition, the left image 21 of a range corresponding to the moved right image 23 appears on the right side of the first original position.

K of FIG. 5 shows the display example when the left image 21 is moved to the right side and the right image 23 is moved to the right side.

The moving directions of the left image 21 and the right image 23 are opposite to each other while the movement amounts are the same. At this time, it is possible to obtain the pop-out effect, and the distance between the moved left image 21 and the right image 23 is set to the disparity.

Next, description will be made of the processing example of the respective parts.

Figure 6:
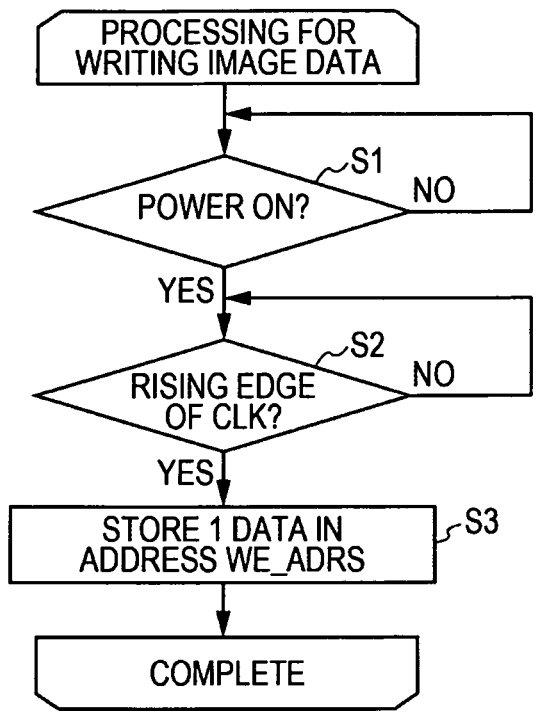
FIG. 6 is a flow chart illustrating an example of image data writing processing according to an embodiment of the present invention.

FIG. 6 shows an example of the image data writing processing.

First, the writing unit 3 determines whether or not the power of the signal processing apparatus 10 is turned on (step S1). If the power is not turned on, the writing unit 3 waits for the input of the power.

If the power is turned on, the writing unit 3 determines whether or not the clock is on the rising edge (step S2). The clock in the following description means a clock to be used for the processing of the video signal with the assumption of a circuit operating on the rising edge as an example.

If the clock is on the rising edge, the writing unit 3 performs the following processing (step S3). That is, the writing unit 3 causes the left image memory 5L to store the left image data (I_LEFT_DATA) in the left image writing address (WR_ADRS_LEFT). On the other hand, the writing unit 3 causes the right image memory 5R to store the right image data (I_RIGHT_DATA) in the right image writing address (WR_ADRS_RIGHT).

Figure 7:
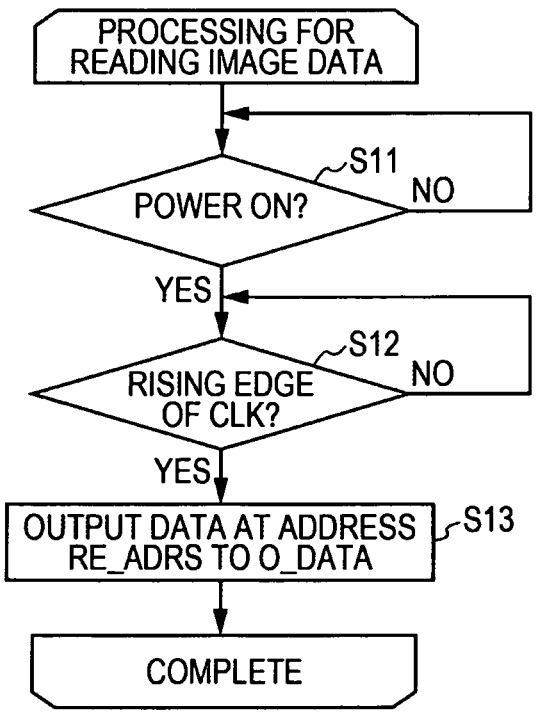
FIG. 7 is a flow chart illustrating an example of image data reading processing according to an embodiment of the present invention.

FIG. 7 shows an example of image data reading processing.

First, the reading unit 7 determines whether or not the power of the signal processing apparatus 10 is turned on (step S11). If the power is not turned on, the reading unit 7 waits for the input of the power.

If the power is turned on, the reading unit 7 determines whether or not the clock is on the rising edge (step S12). If the clock is not on the rising edge, the reading unit 7 waits for the rising edge of the clock.

If the clock is on the rising edge, the reading unit 7 performs the following processing (step S13). That is, the reading unit 7 reads from the left image memory 5L the left image data (I_LEFT_DATA) in the left image reading address (RE_ADRS_LEFT). On the other hand, the reading unit 7 reads from the right image memory 5R the right image data (I_RIGHT_DATA) in the right image reading address (RE_ADRS_RIGHT).

Figure 8:
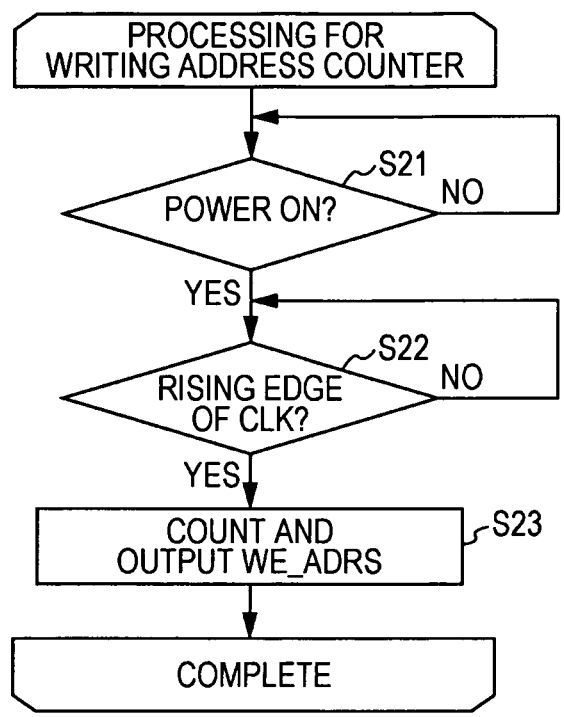
FIG. 8 is a flow chart illustrating an example of writing address counter processing according to an embodiment of the present invention.

FIG. 8 shows an example of the address counting processing performed by a writing address counter (a collective term of the left image writing address counter 11L and the right image writing address counter 11R).

First, the writing address counter determines whether or not the power of the signal processing apparatus 10 is turned on (step S21). If the power is not turned on, the writing address counter waits for the input of the power.

If the power is turned on, the writing address counter determines whether or not the clock is on the rising edge (step S22). If the clock is not on the rising edge, the writing address counter waits for the rising edge of the clock.

If the clock is on the rising edge, the writing address counter performs the following processing (step S23). That is, the left image writing address counter 11L counts the left image writing address (WR_ADRS_LEFT) and outputs this address value to the left image memory 5L. On the other hand, the right image writing address counter 11R counts the right image writing address (WR_ADRS_RIGHT) and outputs this address value to the right image memory 5R.

Figure 9:
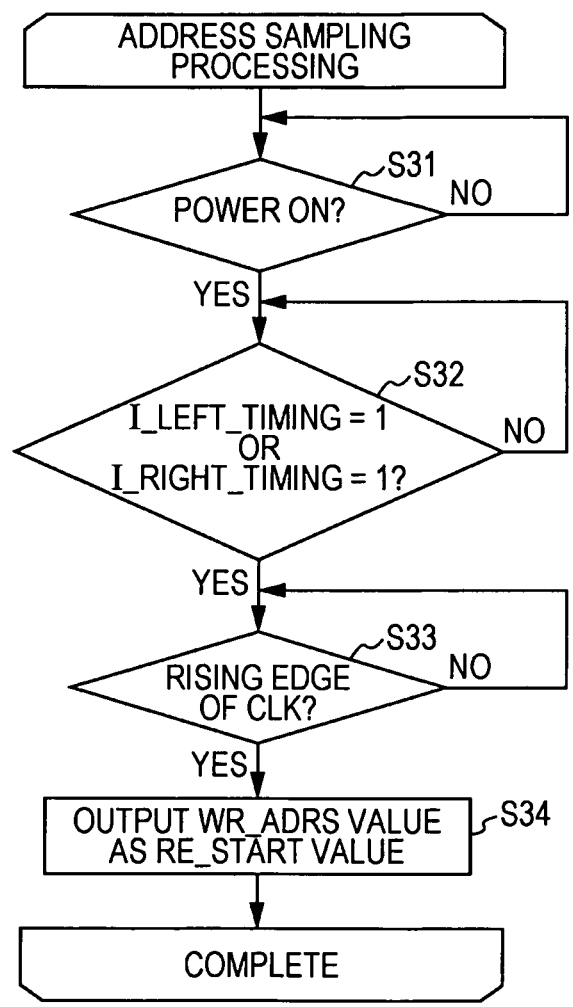
FIG. 9 is a flow chart illustrating an example of address sampling processing according to an embodiment of the present invention.

FIG. 9 shows an example of the address sampling processing performed by an address sampling unit (a collective term of the left image address sampling unit 12L and the right image address sampling unit 12R).

First, the address sampling unit determines whether or not the power of the signal processing apparatus 10 is turned on (step S31). If the power is not turned on, the address sampling unit waits for the input of the power.

If the power is turned on, the address sampling unit determines whether or not the timing (I_LEFT_TIMING or I_RIGHT TIMING) is equal to "1" (step S32). If the timing is not equal to "1", the address sampling unit waits until the timing becomes equal to "1".

If the timing is equal to "1", the address sampling unit determines whether or not the clock is on the rising edge (step S33). If the clock is not on the rising edge, the address sampling unit waits for the rising edge of the clock.

If the clock is on the rising edge, the address sampling unit performs the following processing (step S34). That is, the left image address sampling unit 12L outputs to the second adding units 16L and the first adding unit 13L the address value of the left image writing address (WR_ADRS_LEFT) as the left image reading start address (RE_START_LEFT). On the other hand, the right image address sampling unit 12R outputs to the second adding unit 16R and the first adding unit 13R the address value of the right image writing address (WR_ADRS_RIGHT) as the right image reading start address (RE_START_RIGHT).

Figure 10:
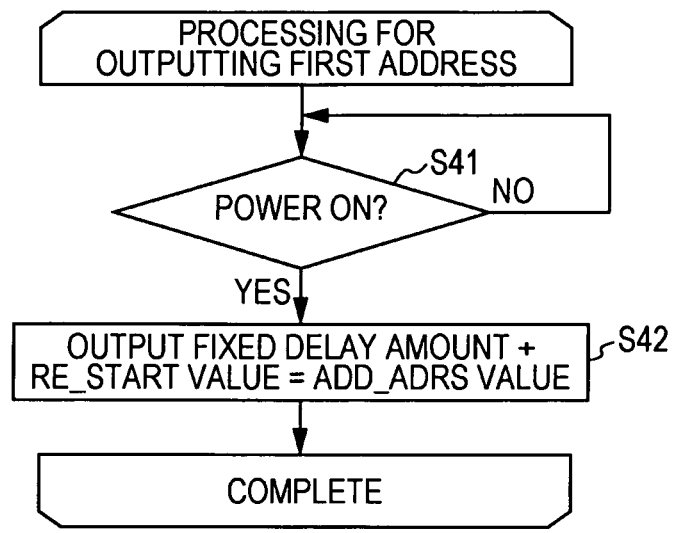
FIG. 10 is a flow chart illustrating an example of first address output processing according to an embodiment of the present invention.

FIG. 10 shows an example of the second address output processing performed by a first adding unit (a collective term of the first adding units 13L and 13R).

First, the first adding unit determines whether or not the power of the signal processing apparatus 10 is turned on (step S41). If the power is not turned on, the first adding unit waits for the input of the power.

If the power is turned on, the first adding unit performs the following processing (step S42). That is, the first adding unit 13L adds the left image reading start address (RE_START_LEFT) received from the left image address sampling unit 12L and the fixed delay amount ("512" in this embodiment). Thereafter, the first adding unit 13L outputs this added value to the left image reading address counter 17L as a left image added address (ADD_ADRS_LEFT).

On the other hand, the first adding unit 13R adds the right image reading start address (RE_START_RIGHT) received from the right image address sampling unit 12R and the fixed delay amount. Thereafter, the first adding unit 13R outputs this added value to the right image reading address counter 17R as a right image added address (ADD_ADRS_RIGHT).

Figure 11:
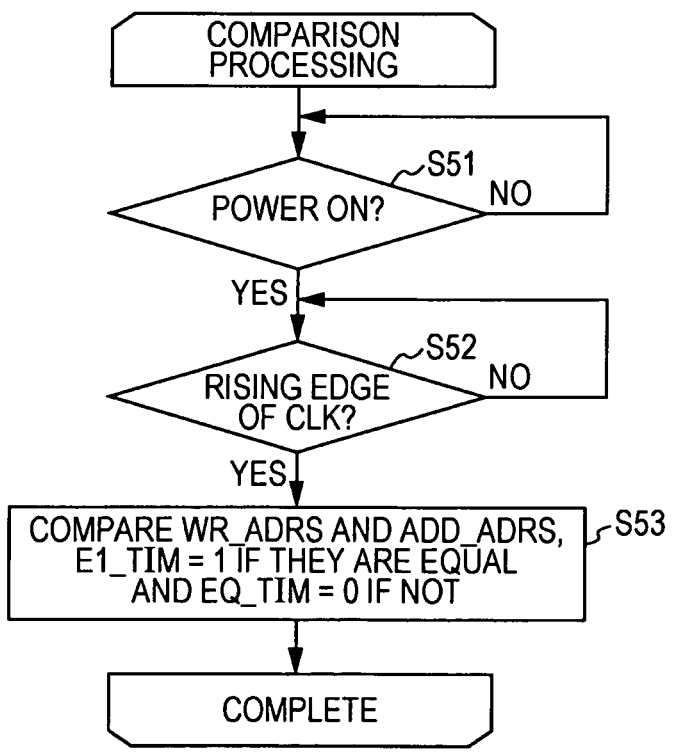
FIG. 11 is a flow chart illustrating an example of comparison processing according to an embodiment of the present invention.

FIG. 11 shows an example of the address comparison processing performed by a comparing unit (a collective term of the comparing units 14L and 14R).

First, the comparing unit determines whether or not the power of the signal processing apparatus 10 is turned on (step S51). If the power is not turned on, the comparing unit waits for the input of the power.

If the power is turned on, the comparing unit determines whether or not the clock is on the rising edge (step S52). If the clock is not on the rising edge, the comparing unit waits for the rising edge of the clock.

If the clock is on the rising edge, the comparing unit performs the following processing (step S53). That is, the comparing unit 14L compares the left image writing address (WR_ADRS_LEFT) input from the left image writing address counter 11L with the left image added address (ADD_ADRS_LEFT) input from the first adding unit 13L. The comparing unit determines that the equivalent timing (EQ_TIM)=1 when these addresses are equal to each other while the comparing unit determines that the equivalent timing (EQ_TIM)≠1 when these addresses are not equal to each other.

On the other hand, the comparing unit 14R compares the right image writing address (WR_ADRS_RIGHT) input from the right image writing address counter 11R with the right image added address (ADD_ADRS_RIGHT) input from the first adding unit 13R. The comparing unit determines that the equivalent timing (EQ_TIM)=1 when these addresses are equal to each other while the comparing unit determines that the equivalent timing (EQ_TIM)≠1 when these addresses are not equal to each other.

Figure 12:
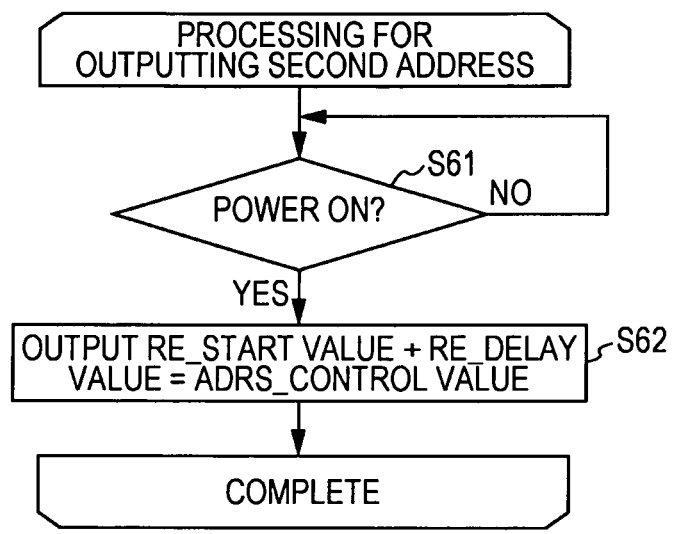
FIG. 12 is a flow chart illustrating an example of second address output processing according to an embodiment of the present invention.

FIG. 12 shows an example of the first address output processing performed by a second adding unit (a collective term of the second adding units 16L and 16R).

First, the second adding unit determines whether or not the power of the signal processing apparatus 10 is turned on (step S61). If the power is not turned on, the second adding unit waits for the input of the power.

If the power is turned on, the second adding unit performs the following processing (step S62). That is, the second adding unit 16L adds the left image reading start address (RE_START_LEFT) received from the left image address sampling unit 12L and the left image reading delay amount (RE_LEFT_DELAY) received from the delay amount control unit 15. Thereafter, the second adding unit 16L outputs this added value to the left image reading address counter 17L as the left image control address value (LEFT_ADRS_CONTROL).

On the other hand, the second adding unit 16R adds the right image reading start address (RE_START_RIGHT) received from the right image address sampling unit 12R and the right image reading delay amount (RE_RIGHT_DELAY) received from the delay amount control unit 15. Thereafter, the second adding unit 16R outputs this added value to the right image reading address counter 17R as the right image control address value (RIGHT_ADRS_CONTROL).

Figure 13:
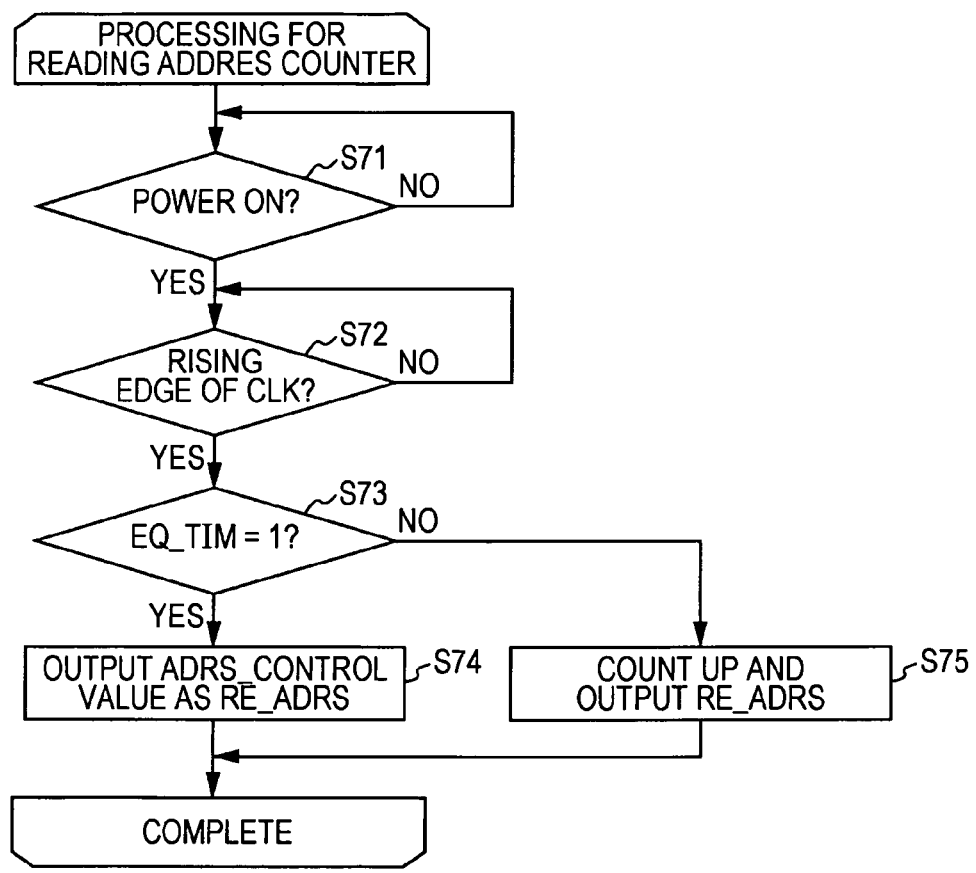
FIG. 13 is a flow chart illustrating an example of reading address counter processing according to an embodiment of the present invention.

FIG. 13 shows an example of the reading address counting performed by a reading address counter (a collective term of the left image reading address counter 17L and the right image reading address counter 17R).

First, the reading address counter determines whether or not the power of the signal processing apparatus 10 is turned on (step S71). If the power is not turned on, the reading address counter waits for the input of the power.

If the power is turned on, the reading address counter determines whether or not the clock is on the rising edge (step S72). If the clock is not on the rising edge, the reading address counter waits for the rising edge of the clock.

If the clock is on the rising edge, the reading address counter determines whether or not the equivalent timing (EQ_TIM)=1 (step S73). When the equivalent timing (EQ_TIM)=1, the reading address counter performs the following processing (step S74). That is, the left image reading address counter 17L outputs the value of the left image control address (LEFT_ADRS_CONTROL) as the left image reading address (RE_ADRS_LEFT). On the other hand, the right image reading address counter 17R outputs the value of the right image control address (RIGHT_ADRS_CONTROL) as the right image reading address (RE_ADRS_RIGHT).

When the equivalent timing (EQ_TIM)≠1 in the processing of the step S73, the reading address counter performs the following processing (step S75). That is, the left image reading address counter 17L counts and outputs the left image reading address (RE_ADRS_LEFT). On the other hand, the right image reading address counter 17R counts and outputs the right image reading address (RE_ADRS_RIGHT).

Figure 14:
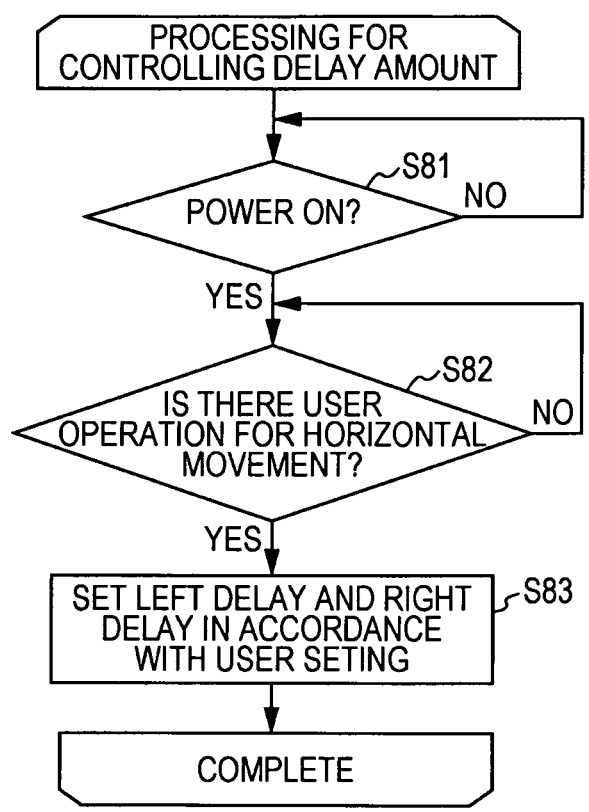
FIG. 14 is a flow chart illustrating an example of control for delaying reading of signals of left and right images according to an embodiment of the present invention.

FIG. 14 shows an example of the control performed by the delay amount control unit 15 to delay the reading of the left and right image signals.

First, the delay amount control unit 15 determines whether or not the power of the signal processing apparatus 10 is turned on (step S81). If the power is not turned on, the delay amount control unit 15 waits for the input of the power.

If the power is turned on, the delay amount control unit 15 determines whether or not the user has operated the operating unit 9 to horizontally move the left image and the right image (step S82). If the user has not operated to horizontally move the images, the delay amount control unit 15 waits for the input of the operation.

If the user has operated to horizontally move the images, the delay amount control unit 15 sets the left image reading delay amount (RE_LEFT_DELAY) or the right image reading delay amount (RE_RIGHT_DELAY) in accordance with the horizontal movement operation set by the user. Thereafter, the delay amount control unit 15 outputs the set reading delay amount to the second adding units 16L and 16R (step S83).

Figure 15:
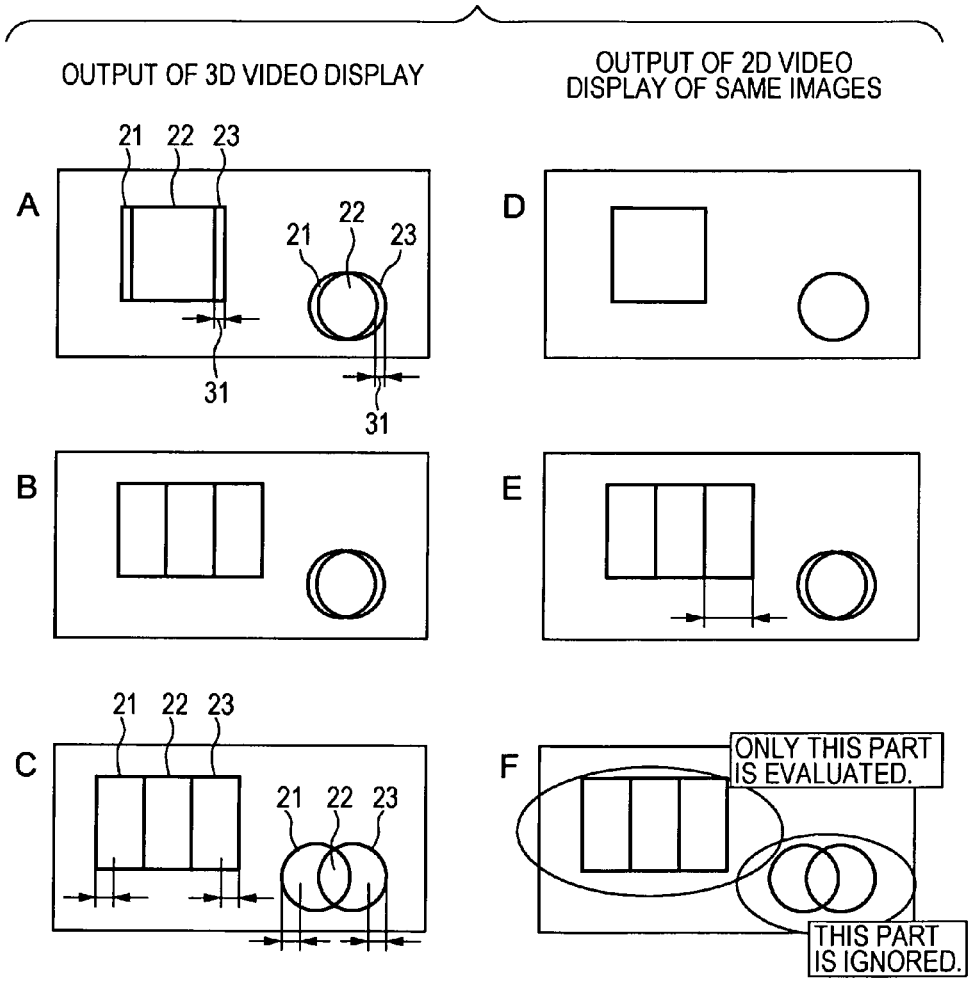
FIG. 15 is an explanatory diagram illustrating a display example when a phase difference between left and right images is changed according to an embodiment of the present invention.

A to F of FIG. 15 show a display example of a case in which the left image and the right image are horizontally moved.

A of FIG. 15 shows a display of a three-dimensional monitor before correction.

If the image shown in A of FIG. 15 is displayed on a two-dimensional monitor, the image appears as shown in D of FIG. 15. Two objects including a square shape and a circular shape appear while the left image 21 and the right image 23 appear in the display on the three-dimensional monitor where disparity 31 exists therebetween.

B of FIG. 15 shows a display of the three-dimensional monitor as a result of the setting so as to cause only the object shown by the square shape in A of FIG. 15 to appear on the further back side due to the depth effect. If correction is made to broaden the disparity, it is possible for the user viewing the three-dimensional monitor to feel that the object is positioned on the further side in the screen. Here, it is necessary to consider how wide the disparity is to be broadened to achieve the intended feeling of depth.

E of FIG. 15 shows a method in related art.

It was necessary to correct the data of the object to be shown on the further side, display the corrected data as shown in E of FIG. 15, and confirm the display. It took a long time to confirm the display since the confirmation was necessary every time the correction was made for data.

C of FIG. 15 shows a method according to the present invention.

The disparity of all the objects is broadened with the use of the functions according to the present invention, and the confirmation is made for the depth effect while attention is paid only to the square object to be corrected and the circular object is ignored as shown in F of FIG. 15. Then, the data of the object is corrected after the disparity amount is determined. With such operations, it is possible to complete the processing of correcting the disparity for a short time since the user can appropriately correct the data of the object while actually feeling the depth effect with a simple operation.

According to the signal processing apparatus 10 of the embodiment described above, it is possible to simulate a three-dimensional effect while creating disparity between the left and right images displayed on the display unit 8, by controlling the phases of the left and right image signals input from the two cameras 1L and 1R. Accordingly, the user can easily confirm the variation in image due to the change of the disparity by operating the operating unit 9. At this time, there is an advantage in that it is possible to greatly shorten the time for imaging in producing contents since it is possible to simply realize how much the disparity distance is to be changed to achieve the intended effect.

In addition, when the screen display is the one to which the disparity value on the monitor has been added, the screen display representing a "simulation state" is performed. When disparity metadata is included in the displayed image data, the disparity metadata is displayed, and the disparity value given in the simulation is also displayed on the screen. With such a configuration, there is an advantage that it is possible to appropriately give the disparity since the change in the disparity with respect to the movement amounts of the left and right images can be easily recognized.

Moreover, it is possible to confirm the effect after the change by displaying the left and right images captured with a certain disparity with a simple experimental processing to perform disparity adjustment as later processing. At this time, any configuration is applicable in which one of the left and right images are fixed while the other image is horizontally moved or in which both the images are moved in the horizontally opposite directions. Furthermore, it is also possible to add or reduce, not in the sense of adjustment, in a positive manner the disparity in regard to a certain object compared with that at the time of capturing the image thereof.

In addition, it is also applicable that a recording medium recording a program code of software implementing the functions of the embodiment described above is provided in the signal processing apparatus 10. Moreover, it is needless to say that the functions can be implemented if the signal processing apparatus 10 reads and performs the program code stored in the recording medium.

It is possible to use a flexible disk, a hard disk, an optical disk, a magneto-optical disk, a CD-ROM, a CD-R, a magnetic tape, a nonvolatile memory card, a ROM, or the like, for example, as the recording medium to provide the program code in this case.

Moreover, it is possible to implement the functions of the embodiment described above by performing the program code read by the signal processing apparatus 10. In addition, a part of or all of the actual processing is performed by an OS or the like working on the signal processing apparatus 10 based on the instruction of the program code. The case in which the functions of the embodiment described above are implemented by the processing is also included.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising: a phase matching unit which matches phases of a left image signal and a right image signal input from two cameras which are disposed so as to be matched with an interval between both eyes of a human to image the same object; and a phase adjusting unit which moves in a horizontal direction by a predetermined distance both or any one of a left image and a right image displayed on a display unit by the left image signal and the right image signal by changing the phases of the left image signal and/or the right image signal in the horizontal direction based on displacement amounts of phases designated by an operating unit, and outputs the left image signal and the right image signal obtained by changing disparity between the left image and the right image; wherein the phase matching unit includes a writing address counter which counts a writing address of the left image signal written in a left image memory by a writing unit and a writing address of the right image signal written in a right image memory, an address sampling unit which obtains a reading start address to be used by the reading unit to read the left image signal from the left image memory and a reading start address to be used to read the right image signal from the right image memory, a first adding unit which outputs an added address obtained by adding the reading start address and a fixed delay amount determined based on variable amounts of the phases of the left image signal and the right image signal, and a comparing unit which compares the writing address and the added address and outputs the position of the added address in the writing address as equivalent timing at which the phases of the left image signal and the right image signal are matched with each other, wherein the phase adjusting unit includes a delay amount control unit which controls a reading delay amount for the left image signal read from the left image memory and a reading delay amount for the right image signal read from the right image memory based on the input operation to the operating unit, a second adding unit which adds the reading delay amount and the reading start address to output the control address to control the reading positions for the left image signal read from the left image memory and the right image signal read from the right image memory, and a reading address counter which counts a reading address to be used by the reading unit to read the left image signal from the left image memory and the reading address to be used to read the right image signal from the right image memory.

2. The signal processing apparatus according to claim 1, wherein the phase adjusting unit controls the display unit to display a displacement amount of the phases designated by the operating unit and metadata input from the cameras.

3. The signal processing apparatus according to claim 2, wherein the display unit is a three-dimensional monitor which displays the object in a three-dimensional manner based on the left image signal read from the left image memory and the right image signal read from the right image memory.

4. A signal processing method comprising the steps of: matching phases of a left image signal and a right image signal input from two cameras which are disposed so as to be matched with an interval between both eyes of a human to image a same object; and moving in a horizontal direction by a predetermined distance both or any one of a left image and a right image displayed on a display unit by the left image signal and the right image signal by changing the phases of the left image signal and/or the right image signal in the horizontal direction based on displacement amounts of phases designated by an operating unit, and outputting the left image signal and the right image signal obtained by changing disparity between the left image and the right image;

wherein the phase matching unit includes a writing address counter which counts a writing address of the left image signal written in a left image memory by a writing unit and a writing address of the right image signal written in a right image memory, an address sampling unit which obtains a reading start address to be used by the reading unit to read the left image signal from the left image memory and a reading start address to be used to read the right image signal from the right image memory, a first adding unit which outputs an added address obtained by adding the reading start address and a fixed delay amount determined based on variable amounts of the phases of the left image signal and the right image signal, and a comparing unit which compares the writing address and the added address and outputs the position of the added address in the writing address as equivalent timing at which the phases of the left image signal and the right image signal are matched with each other, wherein the phase adjusting unit includes a delay amount control unit which controls a reading delay amount for the left image signal read from the left image memory and a reading delay amount for the right image signal read from the right image memory based on the input operation to the operating unit, a second adding unit which adds the reading delay amount and the reading start address to output the control address to control the reading positions for the left image signal read from the left image memory and the right image signal read from the right image memory, and a reading address counter which counts a reading address to be used by the reading unit to read the left image signal from the left image memory and the reading address to be used to read the right image signal from the right image memory.

5. A display apparatus comprising: a phase matching unit which matches phases of a left image signal and a right image signal input from two cameras which are disposed so as to be matched with an interval between both eyes of a human to image a same object; a display unit which displays a left image and a right image based on the left image signal and the right image signal; and a phase adjusting unit which moves in a horizontal direction by a predetermined distance both or any one of the left image and the right image by changing the phases of the left image signal and/or the right image signal in the horizontal direction based on displacement amounts of phases designated by an operating unit, and outputs the left image signal and the right image signal obtained by changing disparity between the left image and the right image; wherein the phase matching unit includes a writing address counter which counts a writing address of the left image signal written in a left image memory by a writing unit and a writing address of the right image signal written in a right image memory, an address sampling unit which obtains a reading start address to be used by the reading unit to read the left image signal from the left image memory and a reading start address to be used to read the right image signal from the right image memory, a first adding unit which outputs an added address obtained by adding the reading start address and a fixed delay amount determined based on variable amounts of the phases of the left image signal and the right image signal, and a comparing unit which compares the writing address and the added address and outputs the position of the added address in the writing address as equivalent timing at which the phases of the left image signal and the right image signal are matched with each other, wherein the phase adjusting unit includes a delay amount control unit which controls a reading delay amount for the left image signal read from the left image memory and a reading delay amount for the right image signal read from the right image memory based on the input operation to the operating unit, a second adding unit which adds the reading delay amount and the reading start address to output the control address to control the reading positions for the left image signal read from the left image memory and the right image signal read from the right image memory, and a reading address counter which counts a reading address to be used by the reading unit to read the left image signal from the left image memory and the reading address to be used to read the right image signal from the right image memory.

6. Non-transitory computer readable medium contain a program which causes a computer to implement the steps of: matching phases of a left image signal and a right image signal input from two cameras which are disposed so as to be matched with an interval between both eyes of a human to image a same object; and moving in a horizontal direction by a predetermined distance both or any one of a left image and a right image displayed on a display unit by the left image signal and the right image signal by changing the phases of the left image signal and/or the right image signal in the horizontal direction based on displacement amounts of phases designated by an operating unit, and outputting the left image signal and the right image signal obtained by changing disparity between the left image and the right image; wherein the phase matching unit includes a writing address counter which counts a writing address of the left image signal written in a left image memory by a writing unit and a writing address of the right image signal written in a right image memory, an address sampling unit which obtains a reading start address to be used by the reading unit to read the left image signal from the left image memory and a reading start address to be used to read the right image signal from the right image memory, a first adding unit which outputs an added address obtained by adding the reading start address and a fixed delay amount determined based on variable amounts of the phases of the left image signal and the right image signal, and a comparing unit which compares the writing address and the added address and outputs the position of the added address in the writing address as equivalent timing at which the phases of the left image signal and the right image signal are matched with each other, wherein the phase adjusting unit includes a delay amount control unit which controls a reading delay amount for the left image signal read from the left image memory and a reading delay amount for the right image signal read from the right image memory based on the input operation to the operating unit, a second adding unit which adds the reading delay amount and the reading start address to output the control address to control the reading positions for the left image signal read from the left image memory and the right image signal read from the right image memory, and a reading address counter which counts a reading address to be used by the reading unit to read the left image signal from the left image memory and the reading address to be used to read the right image signal from the right image memory.

* * * * *